United States Patent
Yamazaki et al.

(10) Patent No.: US 10,313,896 B2
(45) Date of Patent: Jun. 4, 2019

(54) COMMUNICATION SYSTEM AND RADIO TERMINAL

(71) Applicant: KYOCERA CORPORATION, Kyoto (JP)

(72) Inventors: Chiharu Yamazaki, Tokyo (JP); Masato Fujishiro, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 37 days.

(21) Appl. No.: 15/326,243

(22) PCT Filed: Jul. 13, 2015

(86) PCT No.: PCT/JP2015/070001
§ 371 (c)(1),
(2) Date: Jan. 13, 2017

(87) PCT Pub. No.: WO2016/009983
PCT Pub. Date: Jan. 21, 2016

(65) Prior Publication Data
US 2017/0208482 A1    Jul. 20, 2017

(30) Foreign Application Priority Data

Jul. 16, 2014  (JP) ................................. 2014-146266

(51) Int. Cl.
*H04W 16/32* (2009.01)
*H04W 88/06* (2009.01)
(Continued)

(52) U.S. Cl.
CPC ........... *H04W 16/32* (2013.01); *H04W 48/08* (2013.01); *H04W 48/16* (2013.01); *H04W 48/18* (2013.01); *H04W 88/06* (2013.01); *H04W 88/08* (2013.01)

(58) Field of Classification Search
CPC ..... H04W 16/32; H04W 88/06; H04W 48/16; H04W 48/08; H04W 48/18; H04W 88/08
See application file for complete search history.

(56) References Cited

U.S. PATENT DOCUMENTS

2010/0008323 A1*  1/2010  Deshpande ........... H04W 48/12
                                                        370/331
2010/0093340 A1   4/2010  Buracchini
(Continued)

FOREIGN PATENT DOCUMENTS

JP    2007-529920 A    10/2007
JP    2010-525624 A     7/2010

OTHER PUBLICATIONS

The extended European search report issued by the European Patent Office on Feb. 20, 2018, which corresponds to European Patent Application No. 15821736.4-1214 and is related to U.S. Appl. No. 15/326,243.

(Continued)

*Primary Examiner* — Kwang B Yao
*Assistant Examiner* — Moo Jeong
(74) *Attorney, Agent, or Firm* — Studebaker & Brackett PC

(57) ABSTRACT

A communication system 1 comprises: a radio base station 100 having a first coverage area 100 A; an access point 200 having a second coverage area 200 A; and a detection assistance apparatus 300 having a third coverage area 300 A. A radio terminal 100 existing in the radio base station 100 starts a discovery procedure for the access point 200, after detecting a detection-use signal broadcast from the detection assistance apparatus 300.

4 Claims, 8 Drawing Sheets

(51) Int. Cl.
*H04W 48/16* (2009.01)
*H04W 48/08* (2009.01)
*H04W 48/18* (2009.01)
*H04W 88/08* (2009.01)

(56) References Cited

U.S. PATENT DOCUMENTS

| | | |
|---|---|---|
| 2011/0263258 A1 | 10/2011 | Soliman et al. |
| 2013/0035098 A1* | 2/2013 | Das .................. H04W 36/04 455/435.1 |
| 2016/0309368 A1 | 10/2016 | Shaheen et al. |
| 2017/0195869 A1* | 7/2017 | Knudsen ................ H04W 8/18 |

OTHER PUBLICATIONS

MediaTek Inc.; Reduce Battery Consumption and Improve WLAN Utilization; 3GPP TSG RAN WG2 #81bis; R2-131032; Apr. 15-19, 2013; Chicago, USA.
Broadcom Corporation; Air-Interface Enhancement Proposals for WLAN/3GPP Radio Interworking; 3GPP TSG-RAN WG2 Meeting #81-BIS; R2-131384; Apr. 15-19, 2013; Chicago, USA.
International Search Report issued in PCT/JP2015/070001; dated Aug. 18, 2015.
Written Opinion issued in PCT/JP2015/070001; dated Aug. 18, 2015.
Wi-Fi Alliance; Discover Wi-Fi; Wi-Fi Certified WiGig; online, URL:http://www.wi-fi.org/discover-wi-fi/wigig-certified.

* cited by examiner

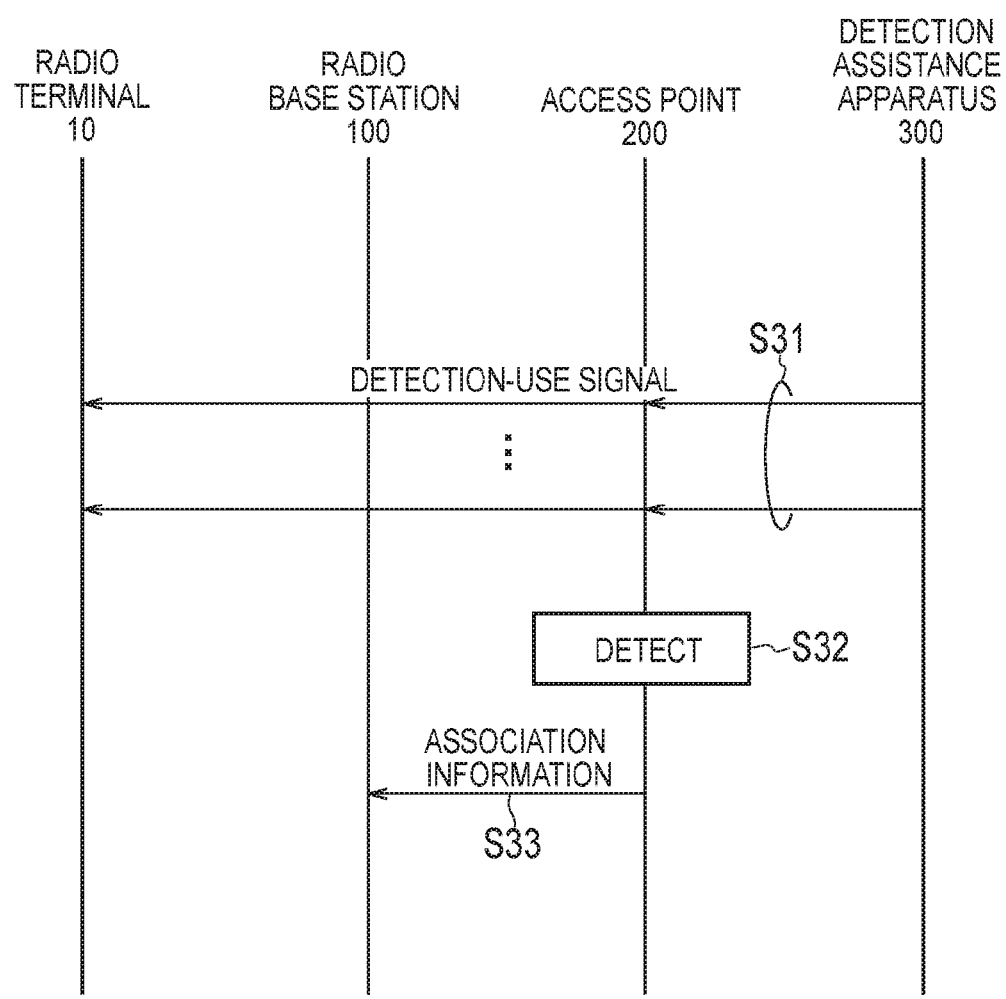

COMMUNICATION SYSTEM AND RADIO TERMINAL

TECHNICAL FIELD

The present invention relates to a communication system provided with a radio base station and an access point, and relates also to a radio terminal used in the communication system.

BACKGROUND ART

Recently, as a service realizing a high-speed data communication, WiGig (Wireless Gigabit) service is proposed. In the WiGig service, a frequency band of 60 GHz band is used, and a transmission speed of 6 to 7 Gbps is realized. However, a coverage area of the WiGig is very small (about 10 m, for example).

It is assumed a utilization scene in which a radio terminal compatible with a mobile communication service represented by LTE (Long Term Evolution) is also compatible with the WiGig service. In such a utilization scene, the radio terminal detects, while existing in a radio base station of a mobile communication service, in the coverage area of the mobile communication service, an access point of the WiGig service (Discovery procedure). Specifically, in the Discovery procedure, the radio terminal detects an access point of the WiGig service by reception of a signal broadcast from the access point of the WiGig service.

PRIOR ART DOCUMENT

Non-Patent Document

Non Patent Document 1: Wi-Fi Alliance, "WiGig CERTIFIED", [online], [searched on Jul. 10, 2014), Internet <URL: http://www.wi-fi.org/discover-wi-fi/wigig-certified>

SUMMARY OF THE INVENTION

A communication system according to a first aspect comprises: a radio base station having a first coverage area; an access point having a second coverage area; and a detection assistance apparatus having a third coverage area. At least a part of the second coverage area overlaps the first coverage area, at least a part of the second coverage area overlaps the third coverage area. A radio terminal existing in the radio base station in the first coverage area starts a discovery procedure for the access point, after detecting a signal broadcast in the third coverage area from the detection assistance apparatus.

A radio terminal according to a second aspect comprises a controller configured to perform a process of starting, when the radio terminal exists in a coverage area of a radio base station, a discovery procedure for an access point after detection of a signal broadcast from a detection assistance apparatus.

A communication system according to a fourth aspect comprises: a radio base station having a first coverage area; an access point having a second coverage area; and a detection assistance apparatus having a third coverage area. At least a part of the second coverage area overlaps the first coverage area, at least a part of the second coverage area overlaps the third coverage area. A radio terminal existing in the radio base station in the first coverage area transmits, to the detection assistance apparatus, terminal information for identifying the radio terminal, in response to detection of a signal broadcast in the third coverage area from the detection assistance apparatus. The detection assistance apparatus or the radio base station transmits, to the radio terminal, channel information for identifying a channel used in the access point.

A radio terminal according to a fourth aspect comprises a controller configured to perform: when the radio terminal exists in a coverage area of a radio base station, a process of transmitting, to a detection assistance apparatus, terminal information for identifying the radio terminal, in response to detection of the signal broadcast from the detection assistance apparatus; and a process of receiving channel information for identifying a channel used in an access point, from the detection assistance apparatus or the radio base station.

BRIEF DESCRIPTION OF THE DRAWINGS

FIG. 9 is a sequence diagram illustrating a communication method according to a sixth modification.

DESCRIPTION OF THE EMBODIMENT

Figure 1:
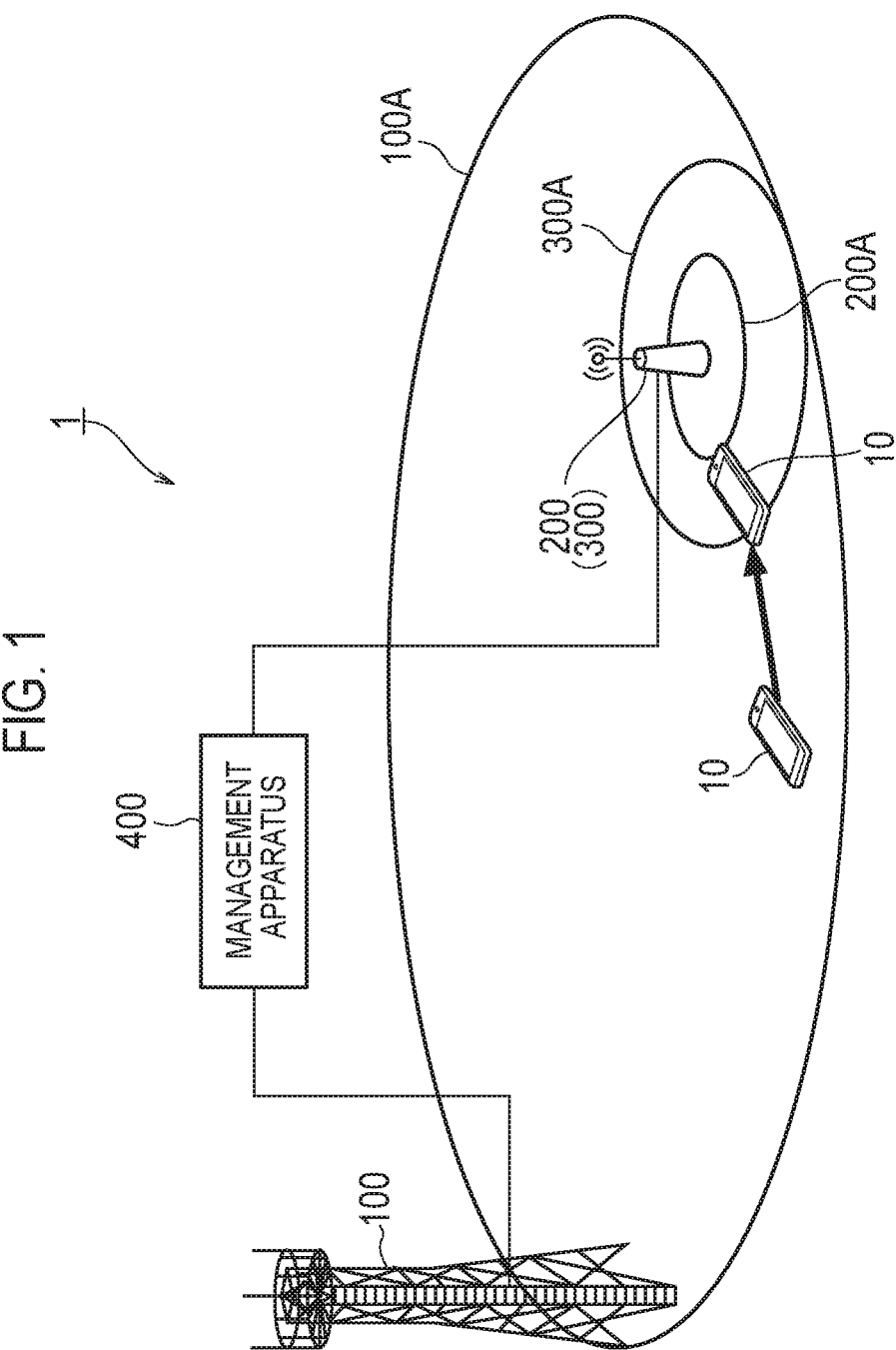
FIG. 1 is a diagram illustrating a communication system 1 according to a first embodiment.

A communication system and communication method according to embodiments of the present invention is described below by referring to the drawings. In the following description of the drawings, same or similar reference numerals are given to denote same or similar portions.

Note that the drawings are merely schematically shown and proportions of sizes and the like are different from actual ones. Thus, specific sizes and the like should be judged by referring to the description below. In addition, there are of course included portions where relationships or percentages of sizes of the drawings are different with respect to one another.

Overview of Embodiments

A communication system according to embodiments comprises: a radio base station having a first coverage area; an access point having a second coverage area that is smaller than the first coverage area; and a detection assistance apparatus having a third coverage area that is smaller than the first coverage area and larger than the second coverage area. At least a part of the second coverage area overlaps the first coverage area, at least a part of the second coverage area overlaps the third coverage area.

Firstly, in the communication system described above, a radio terminal existing in the radio base station in the first coverage area starts a discovery procedure for the access point, after detecting a signal broadcast in the third coverage area from the detection assistance apparatus.

That is, the radio terminal existing in the radio base station starts, in a third coverage area larger than the second coverage area, the discovery procedure for the access point, and thus, it is easy to discover the access point of the radio communication service having a small coverage area and it is also possible to alleviate a search load for the access point of the radio communication service.

Secondly, a radio terminal existing in the radio base station in the first coverage area transmits, to the detection assistance apparatus, terminal information for identifying the radio terminal, in response to detection of a signal broadcast in the third coverage area from the detection assistance apparatus, and the detection assistance apparatus or the radio base station transmits, to the radio terminal, channel information for identifying a channel used in the access point.

That is, the radio terminal existing in the radio base station is capable of using, after detecting a detection-use signal broadcast, in the third coverage area larger than the second coverage area, from the detection assistance apparatus, the channel information received from the detection assistance apparatus or the radio base station so as to detect the access point. Therefore, it is easy to discover the access point of the radio communication service having a small coverage area and it is also possible to alleviate the search load for the access point of the radio communication service.

First Embodiment (Communication system)

A communication system according to a first embodiment will be described, below. FIG. 1 is a diagram illustrating a communication system 1 according to the first embodiment.

As illustrated in FIG. 1, the communication system 1 includes a radio base station 100, an access point 200, a detection assistance apparatus 300, and a management apparatus 400. Further, the communication system 1 includes a radio terminal 10 capable of connecting to the radio base station 100 or the access point 200.

The radio terminal 10 is a terminal such as a cell phone or a tablet computer. The radio terminal 10 has a function of performing radio communication with the access point 200, in addition to a function of performing radio communication with the radio base station 100. Further, the radio terminal 10 has a function of receiving a signal from the detection assistance apparatus 300. The radio terminal 10 may have a function of transmitting a signal to the detection assistance apparatus 300.

The radio base station 100 has a first coverage area 100A, and provides, in the first coverage area 100A, a mobile communication service represented by LTE (Long Term Evolution). The radio base station 100 manages one or a plurality of cells, and the first coverage area 100A is configured by one or a plurality of cells. It is noted that a cell may be thought of as a term to indicate a geographical area, and may also be thought of as a function of performing radio communication with the radio terminal 10.

The access point 200 has a second coverage area 200A, and provides, in the second coverage area 200A, a radio communication service represented by a WiGig (Wireless Gigabit) service. In the WiGig service, a frequency band of 60 GHz band is used, and a transmission speed of 6 to 7 Gbps is realized, for example. For example, the access point 200 broadcasts a discovery request signal used for the radio terminal 10 to discover the access point 200. Preferably, the detection assistance apparatus 300 regularly broadcasts the discovery request signal.

The second coverage area 200A is smaller than the first coverage area 100A. The second coverage area 200A is very small, and is about 10 m, for example. At least a part of the second coverage area 200A overlaps the first coverage area 100A. A whole of the second coverage area 200A may overlap the first coverage area 100A. At least a part of the second coverage area 200A overlaps a third coverage area 300A. A whole of the second coverage area 200A preferably overlaps the third coverage area 300A.

The detection assistance apparatus 300 has the third coverage area 300A and has a function of transmitting a signal so as to reach the radio terminal 10 located in the third coverage area 300A. The detection assistance apparatus 300 may have a function of receiving a signal from the radio terminal 10 located in the third coverage area 300A. For example, the detection assistance apparatus 300 broadcasts a detection-use signal used by the radio terminal 10 to detect the third coverage area 300A. Preferably, the detection assistance apparatus 300 regularly broadcasts the detection-use signal.

The third coverage area 300A is smaller than the first coverage area 100A and larger than the second coverage area 200A. As described above, the third coverage area 300A includes at least a part of the second coverage area 200A. The third coverage area 300A preferably includes a whole of the second coverage area 200A. At least a part of the third coverage area 300A may overlap the first coverage area 100A. A whole of the third coverage area 300A may overlap the first coverage area 100A.

For example, the detection assistance apparatus 300 may be a apparatus that provides, in the third coverage area 300A, a radio communication service (WLAN service) in which a frequency of 2.4 GHz band or 5 GHz band is used. Alternatively, the detection assistance apparatus 300 may be a apparatus that transmits a signal using a Bluetooth (registered trademark) Low Energy technology (e.g., ibeacon (registered trademark)) so as to reach the radio terminal 10 located in the third coverage area 300A. Alternatively, the detection assistance apparatus 300 may be a apparatus that transmits an analog sound wave signal (e.g., Air Stamp (registered trademark)) so as to reach the radio terminal 10 located in the third coverage area 300A.

The detection assistance apparatus 300 may be provided in the access point 200. The detection assistance apparatus 300 may be provided separately of the access point 200. In the first embodiment, a case is illustrated as an example where the detection assistance apparatus 300 is provided in the access point 200.

The management apparatus 400 may be connected to the radio base station 100 and the access point 200. In such a case, the management apparatus 400 has a function of performing interworking between a mobile communication network including the radio base station 100 and an Internet network including the access point 200, for example. The management apparatus 400 may associate the access point 200 having the second coverage area 200A overlapping the first coverage area 100A of the radio base station 100, with the radio base station 100. Alternatively, the management apparatus 400 may associate a geological location of the radio base station 100 and a geological location of the access point 200.

Alternatively, the management apparatus 400 may be connected to the radio base station 100 and the detection assistance apparatus. In such a case, the management apparatus 400 has a function of performing interworking between a mobile communication network including the radio base station 100 and an Internet network including the detection assistance apparatus, for example. The management apparatus 400 may associate the detection assistance apparatus having the third coverage area 300A overlapping the first coverage area 100A of the radio base station 100, with the radio base station 100. Alternatively, the management apparatus 400 may associate a geological location of the radio base station 100 and a geological location of the detection assistance apparatus.

(Application Scene)

In the first embodiment, a case is assumed where the speed of the radio communication service provided by the access point 200 is higher than the mobile communication service provided by the radio base station 100. Therefore, a user has a need of connecting to the access point 200 when the access point 200 is discovered. However, the user may have a need of connecting to the access point 200 due to another factor (e.g., a fee) rather than a communication speed. Further, when the access point 200 is discovered, the user may optionally determine whether to finally connect to the access point 200.

Under such a precondition, the radio terminal 10 existing in the radio base station 100 (that is, a cell managed by the radio base station 100) within the first coverage area 100A starts, after detecting the detection-use signal broadcast, in the third coverage area 300A, from the detection assistance apparatus 300, the discovery procedure for the access point 200. That is, it should be noted that the radio terminal 10 does not search the access point 200 before the detection of the detection-use signal broadcast from the detection assistance apparatus 300.

Here, "existing" may mean either a standby state (RRC idle state) for a cell managed by the radio base station 100, and or a connected state (RRC connected state) where the radio terminal 10 is connected to a cell managed by the radio base station 100.

(Radio Terminal)

Figure 2:
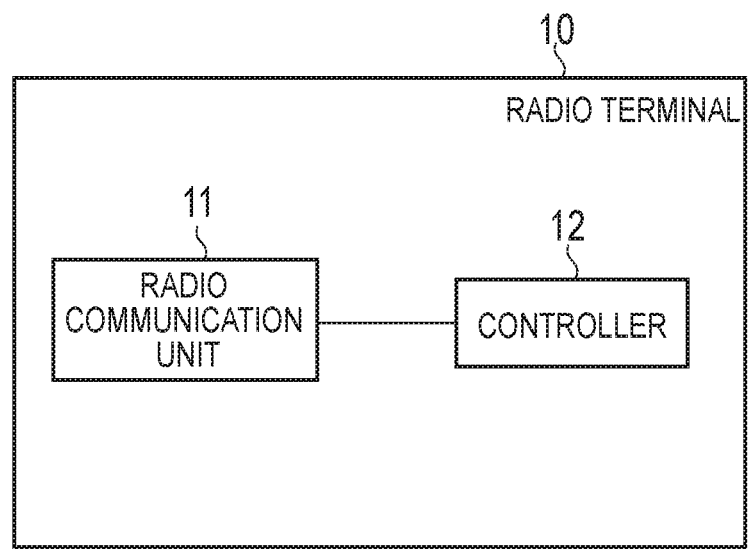
FIG. 2 is a block diagram illustrating a radio terminal 10 according to the first embodiment.

A radio terminal according to the first embodiment will be described, below. FIG. 2 is a block diagram illustrating the radio terminal 10 according to the first embodiment.

As illustrated in FIG. 2, the radio terminal 10 includes a radio communication unit 11 and a controller 12.

The radio communication unit 11 has a function of performing radio communication with the access point 200, in addition to a function of performing radio communication with the radio base station 100. Further, the radio communication unit 11 has a function of receiving a signal from the detection assistance apparatus 300. The radio communication unit 11 may have a function of transmitting a signal to the detection assistance apparatus 300.

The controller 12 controls the radio terminal 10. In the first embodiment, the controller 12 while existing in the radio base station 100 (that is, a cell managed by the radio base station 100) within the first coverage area 100A, starts the discovery procedure for the access point 200, after detecting the detection-use signal broadcast, in the third coverage area 300A, from the detection assistance apparatus 300. That is, the controller 12 instructs the radio communication unit 11 to search a frequency used for the access point 200, after the detection-use signal broadcast from the detection assistance apparatus 300 has been detected.

(Access Point)

Figure 3:
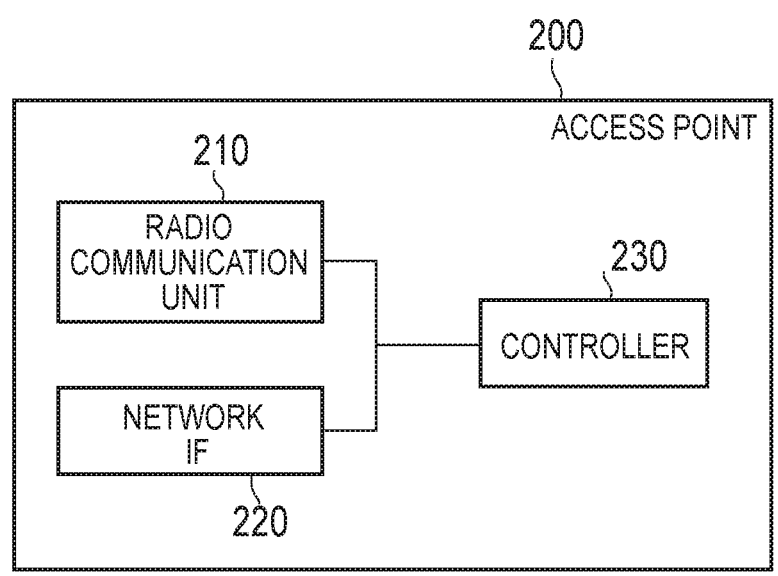
FIG. 3 is a block diagram illustrating a detection assistance apparatus 300 according to the first embodiment.

The access point according to the first embodiment will be described, below. FIG. 3 is a block diagram illustrating the access point 200 according to the first embodiment.

As illustrated in FIG. 3, the access point 200 includes a radio communication unit 210, a network IF 220, and a controller 230.

The radio communication unit 210 performs radio communication with the radio terminal 10 located in the second coverage area 200A. The radio communication unit 210 broadcasts a discovery request signal used for the radio terminal 10 to discover the access point 200. Preferably, the radio communication unit 210 regularly broadcasts the discovery request signal. The radio communication unit 210 receives a discovery response signal returned from the radio terminal 10, in response the discovery request signal.

The network IF 220 has a function of performing communication with the management apparatus 400. It should be noted that the network IF 220 has a function of performing communication, via the management apparatus 400, with the radio base station 100.

The controller 230 controls the access point 200. For example, the controller 230 performs radio communication with the radio terminal 10 that returns the discovery response signal in response to the discovery request signal.

(Communication Method)

Figure 4:
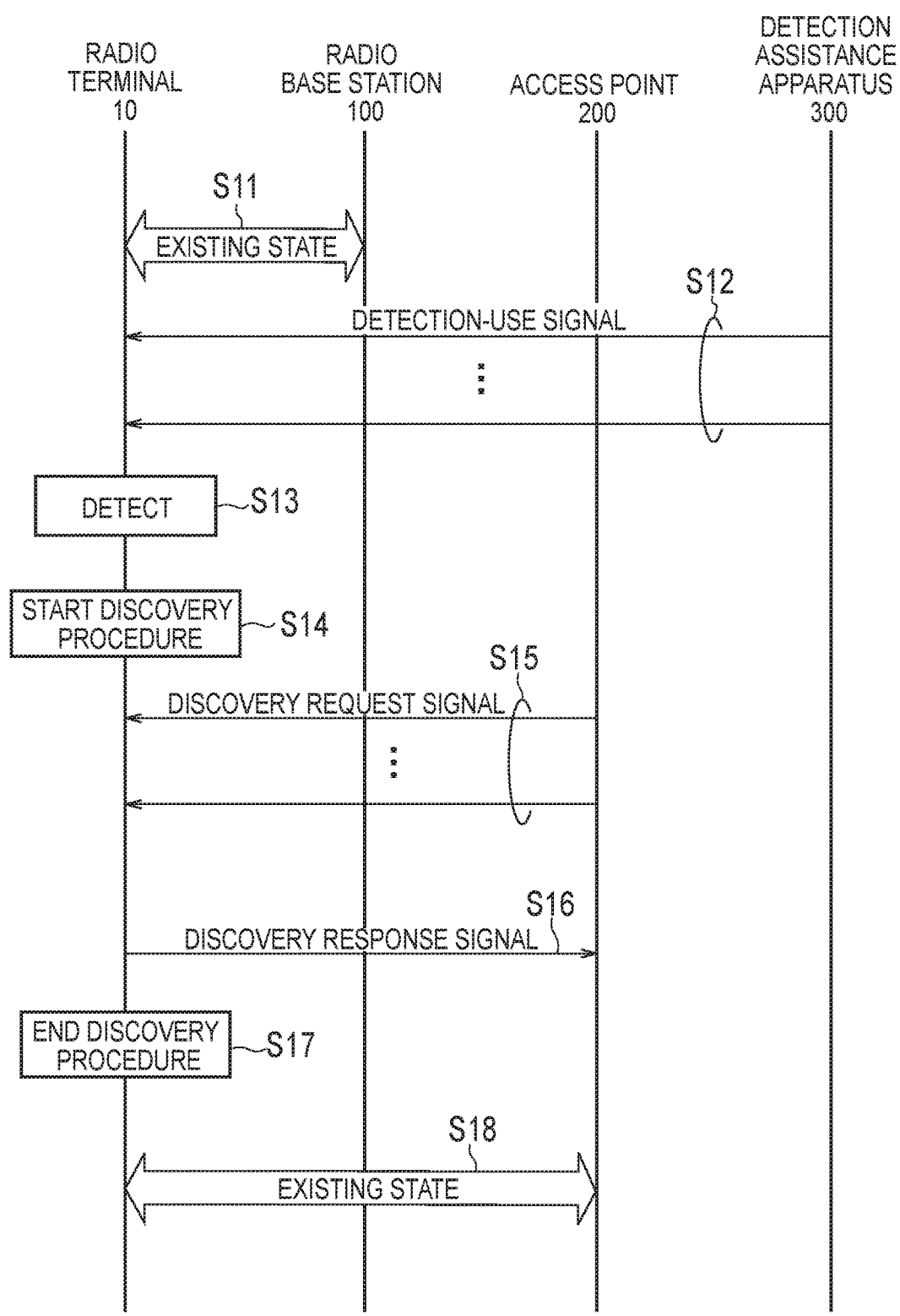
FIG. 4 is a sequence diagram illustrating a communication method according to the first embodiment.

A communication method according to the first embodiment will be described, below. FIG. 4 is a sequence diagram illustrating the communication method according to the first embodiment.

As illustrated in FIG. 4, in step S11, the radio terminal 10 exists in the radio base station 100. As described above, "existing" may mean a standby state (RRC idle state) for a cell managed by the radio base station 100, and a connected state (RRC connected state) where the radio terminal 10 is connected to a cell managed by the radio base station 100.

In step S12, the detection assistance apparatus 300 regularly broadcasts, in the third coverage area 300A, the detection-use signal used for the radio terminal 10 to detect the third coverage area 300A.

In step S13, the radio terminal 10 detects the detection-use signal broadcast from the detection assistance apparatus 300. That is, the radio terminal 10 is located in the third coverage area 300A that includes at least a part of the second coverage area 200A.

In step S14, the radio terminal 10 starts the discovery procedure for the access point 200. That is, the radio terminal 10 starts searching (monitoring) the frequency used in the access point 200.

In step S15, the access point 200 broadcasts, in the second coverage area 200A, the discovery request signal used for the radio terminal 10 to discover the access point 200. It should be noted that in the first embodiment the broadcasting of the discovery request signal is constantly performed also in steps S11 to S14.

In step S16, the radio terminal 10 detects the discovery request signal, and transmits the discovery response signal to the access point 200.

In step S17, the radio terminal 10 ends the discovery procedure for the access point 200. That is, the radio terminal 10 switches the connection to the radio base station 100, to the connection to the access point 200.

In step S18, the radio terminal 10 transitions to a state where to exist in the access point 200.

(Operation and Effect)

In the first embodiment, the radio terminal 10 existing in the radio base station 100 (that is, a cell managed by the radio base station 100) starts, in the third coverage area 300A larger than the second coverage area 200A, the discovery procedure for the access point 200, and thus, it is easy to discover the access point 200 of the radio communication service having a small coverage area and it is also possible to alleviate a search load for the access point 200 of the radio communication service.

[First Modification]

A first modification of the first embodiment will be described, below. Description proceeds with a focus on a difference from the first embodiment, below.

Specifically, although not particularly mentioned in the first embodiment, the radio base station 100 broadcasts configuration information for identifying a trigger to start the discovery procedure for the access point 200. The configuration information preferably is included in an SIB (System Information Block) broadcast from the radio base station 100.

Examples of the configuration information include information for identifying a type of the detection-use signal broadcast from the detection assistance apparatus 300 and a threshold value to be compared with the detection-use signal broadcast from the detection assistance apparatus 300. The configuration information is information such as "ibeacon is better than threshold".

Figure 5:
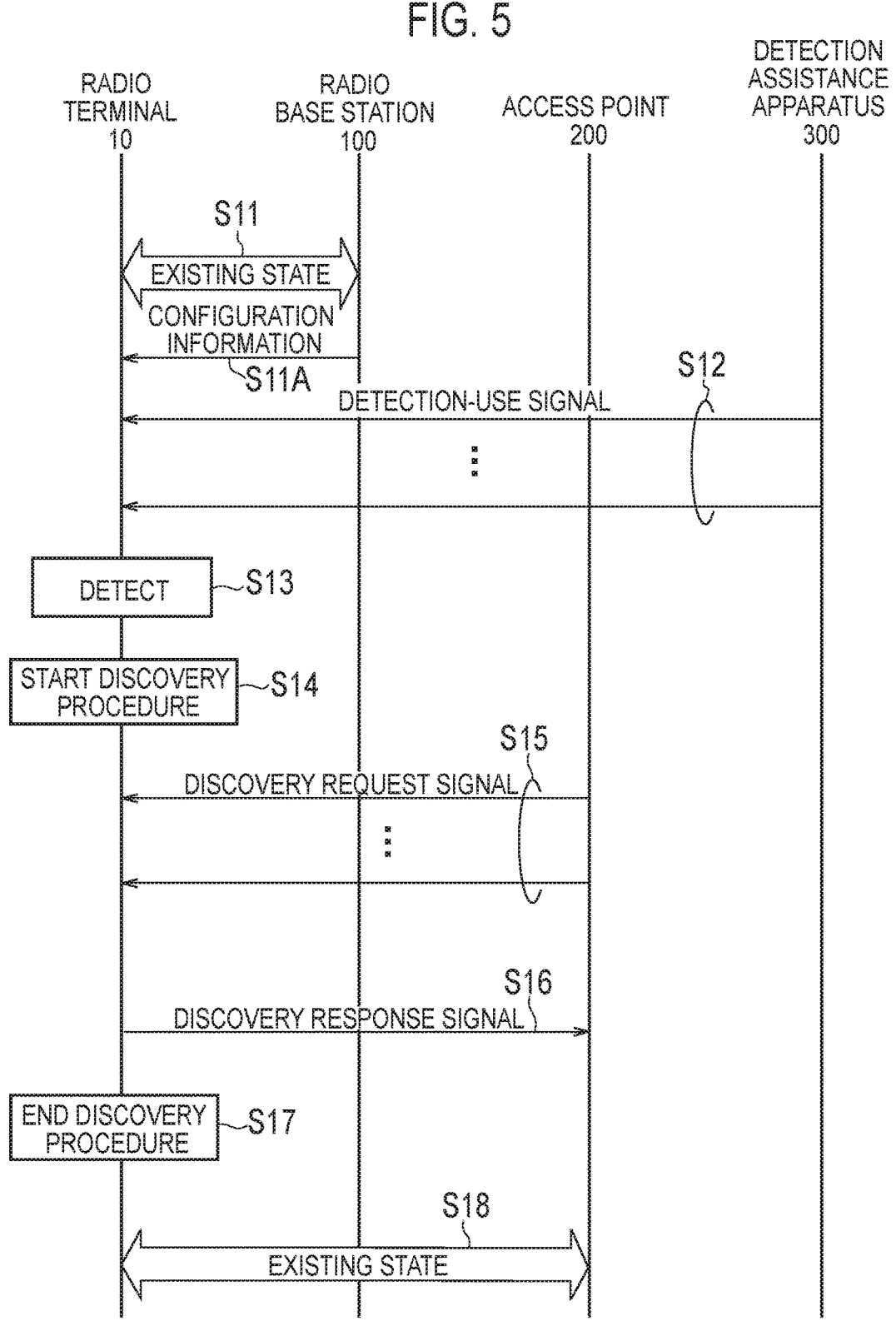
FIG. 5 is a sequence diagram illustrating a communication method according to a first modification.

More particularly, as illustrated in FIG. 5, in step S11A, the radio base station 100 broadcasts configuration information for identifying a trigger to start the discovery procedure for the access point 200.

In step S13, the radio terminal 10 detects, on the basis of the configuration information, the detection-use signal. For example, the radio terminal 10 considers to have detected the detection-use signal when the detection-use signal identified by the configuration information satisfies a condition identified by the configuration information. As a result, in step S14, the radio terminal 10 starts the discovery procedure for the access point 200.

It is noted that in FIG. 5, like step numbers are assigned to processes similar to those in FIG. 4. In FIG. 5, similar processes to those in FIG. 4 are omitted.

[Second Modification]

A second modification of the first embodiment will be described, below. Description proceeds with a focus on a difference from the first embodiment, below.

Specifically, although not particularly mentioned in the first embodiment, the radio terminal 10 transmits, to the radio base station 100, a measurement report of the detection-use signal broadcast, in the third coverage area 300A, from the detection assistance apparatus 300. The radio base station 100 instructs, in response to reception of the measurement report, the access point 200 to start broadcasting of a discovery request broadcast signal that should be detected in the discovery procedure for the access point 200. As a result, it is possible to restrain an unnecessary broadcasting of the discovery request signal.

Figure 6:
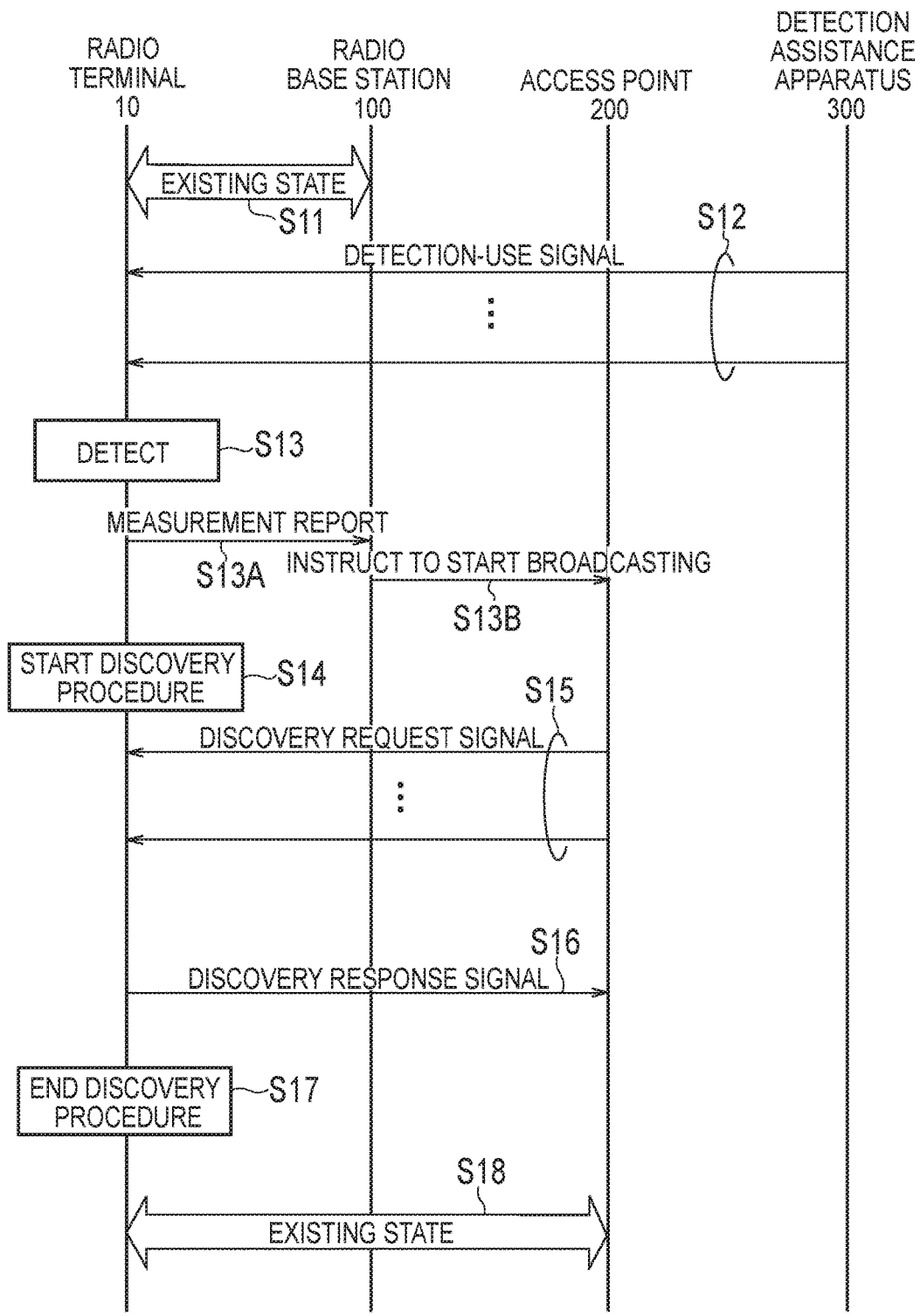
FIG. 6 is a sequence diagram illustrating a communication method according to a second modification.

More particularly, as illustrated in FIG. 6, in step S13A, the radio base station 100 receives, from the radio terminal 10, the measurement report of the detection-use signal broadcast from the detection assistance apparatus 300 in the third coverage area 300A. In step 13B, the radio base station 100 instructs, in response to reception of the measurement report, the access point 200 to start broadcasting of a discovery request broadcast signal that should be detected in the discovery procedure for the access point 200.

It is noted that in FIG. 6, like step numbers are assigned to processes similar to those in FIG. 4. In FIG. 6, a description of similar processes to those of FIG. 4 will be omitted.

Here, in the second modification, the configuration information may be broadcast from the radio base station 100 in much the same way as in the first modification. In such a case, the configuration information preferably is replaced by information (Measurement Trigger) indicating a condition that the measurement report is transmitted to the radio base station 100.

[Third Modification]

A third modification of the first embodiment will be described, below. Description proceeds with a focus on a difference from the first embodiment, below.

Specifically, in the first embodiment, upon detection of the detection-use signal broadcast from the detection assistance apparatus 300, the radio terminal 10 starts the discovery procedure for the access point 200. Unlike this, in the third modification, upon detection of the detection-use signal broadcast from the detection assistance apparatus 300, the radio terminal 10 transmits, to the radio base station 100, terminal information (e.g., UE-ID) for identifying the radio terminal 10, by way of the detection assistance apparatus 300. The radio base station 100 transmits to the radio terminal 10 channel information for identifying a channel used in the access point 200. Here, it should be noted that the channel information is information for identifying the frequency to be searched (monitored) in the discovery procedure for the access point 200. Thus, it is possible to narrow down the frequency that should be searched (monitored) in the discovery procedure for the access point 200, resulting in alleviation of a load of the radio terminal 10 along with the discovery procedure for the access point 200. Therefore, it is easy to discover the access point 200 of the radio communication service having a small coverage area and it is also possible to alleviate the search load for the access point 200 of the radio communication service.

Figure 7:
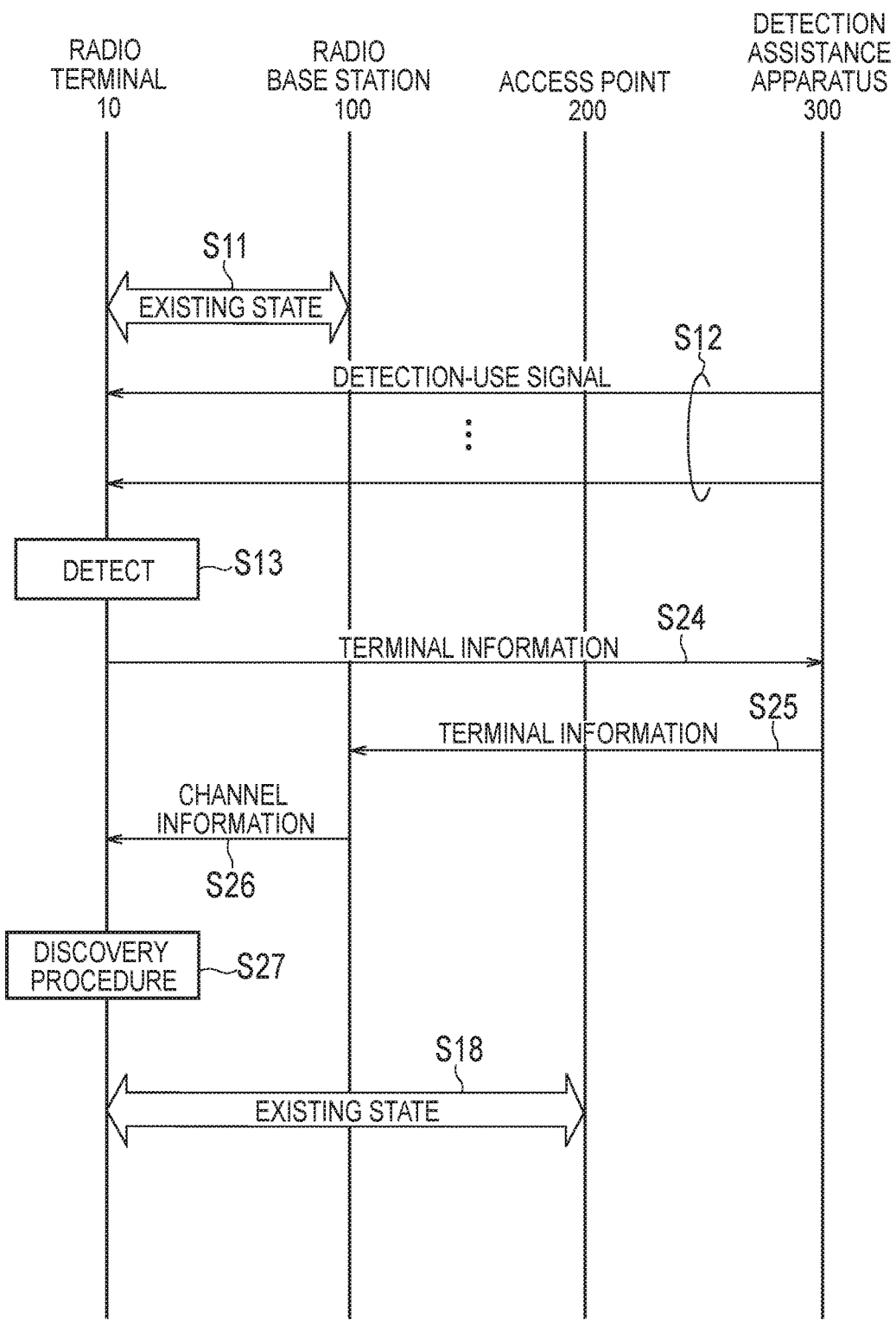
FIG. 7 is a sequence diagram illustrating a communication method according to a third modification.

More particularly, as illustrated in FIG. 7, in step S24, the radio terminal 10 transmits the terminal information (e.g., UE-ID) for identifying the radio terminal 10 to the detection assistance apparatus 300. In step S25, the detection assistance apparatus 300 transmits the terminal information (e.g., UE-ID) for identifying the radio terminal 10 to the radio base station 100. In step S26, the radio base station 100 transmits to the radio terminal 10 channel information for identifying a channel used in the access point 200. In step S27, the radio terminal 10 uses the channel information to perform the discovery procedure for the access point 200.

It is noted that in FIG. 7, like step numbers are assigned to processes similar to those in FIG. 4. In FIG. 7, a description of similar processes to those of FIG. 4 will be omitted.

Here, in the third modification, the configuration information may be broadcast from the radio base station 100 in much the same way as in the first modification. In such a case, the configuration information preferably is replaced by information indicating a condition to transmit the terminal information to the detection assistance apparatus 300.

[Fourth Modification]

A fourth modification of the first embodiment will be described, below. Description proceeds with a focus on a difference from the third modification, below.

In the third modification, upon detection of the detection-use signal broadcast from the detection assistance apparatus 300, the radio terminal 10 transmits, to the detection assistance apparatus 300, the terminal information (e.g., UE-ID) for identifying the radio terminal 10. Unlike this, in the fourth modification, upon detection of the detection-use signal broadcast from the detection assistance apparatus 300, the radio terminal 10 transmits, in addition to the terminal information (e.g., UE-ID) for identifying the radio terminal 10, network information (e.g., PLMN (Public Land Mobile Network)) for identifying a mobile communication network to which the radio base station 100 belongs, to the detection assistance apparatus 300. The network information preferably includes a cell ID for designating a cell in which the radio terminal 10 exists. The detection assistance apparatus 300 transmits the terminal information to the radio base station 100 identified by the network information. As a result, even in an environment where a plurality of communication carriers are mixed, it is possible to identify, by the network information, the appropriate radio base station 100.

[Fifth Modification]

A fifth modification of the first embodiment will be described, below. Description proceeds with a focus on a difference from the first embodiment, below.

Specifically, in the first embodiment, upon detection of the detection-use signal broadcast from the detection assistance apparatus 300, the radio terminal 10 starts the discovery procedure for the access point 200. Unlike this, in the fifth modification, upon detection of the detection-use signal broadcast from the detection assistance apparatus 300, the radio terminal 10 transmits, to the detection assistance apparatus 300, the terminal information (e.g., UE-ID) for identifying the radio terminal 10. The detection assistance apparatus 300 transmits, to the radio terminal 10, channel information for identifying a channel used in the access point 200. Here, it should be noted that the channel information is information for identifying the frequency to be searched (monitored) in the discovery procedure for the access point 200. Thus, it is possible to narrow down the frequency that should be searched (monitored) in the discovery procedure for the access point 200, resulting in alleviation of a load of the radio terminal 10 along with the discovery procedure for the access point 200. Therefore, it is easy to discover the access point 200 of the radio communication service having a small coverage area and it is also possible to alleviate the search load for the access point 200 of the radio communication service.

Figure 8:
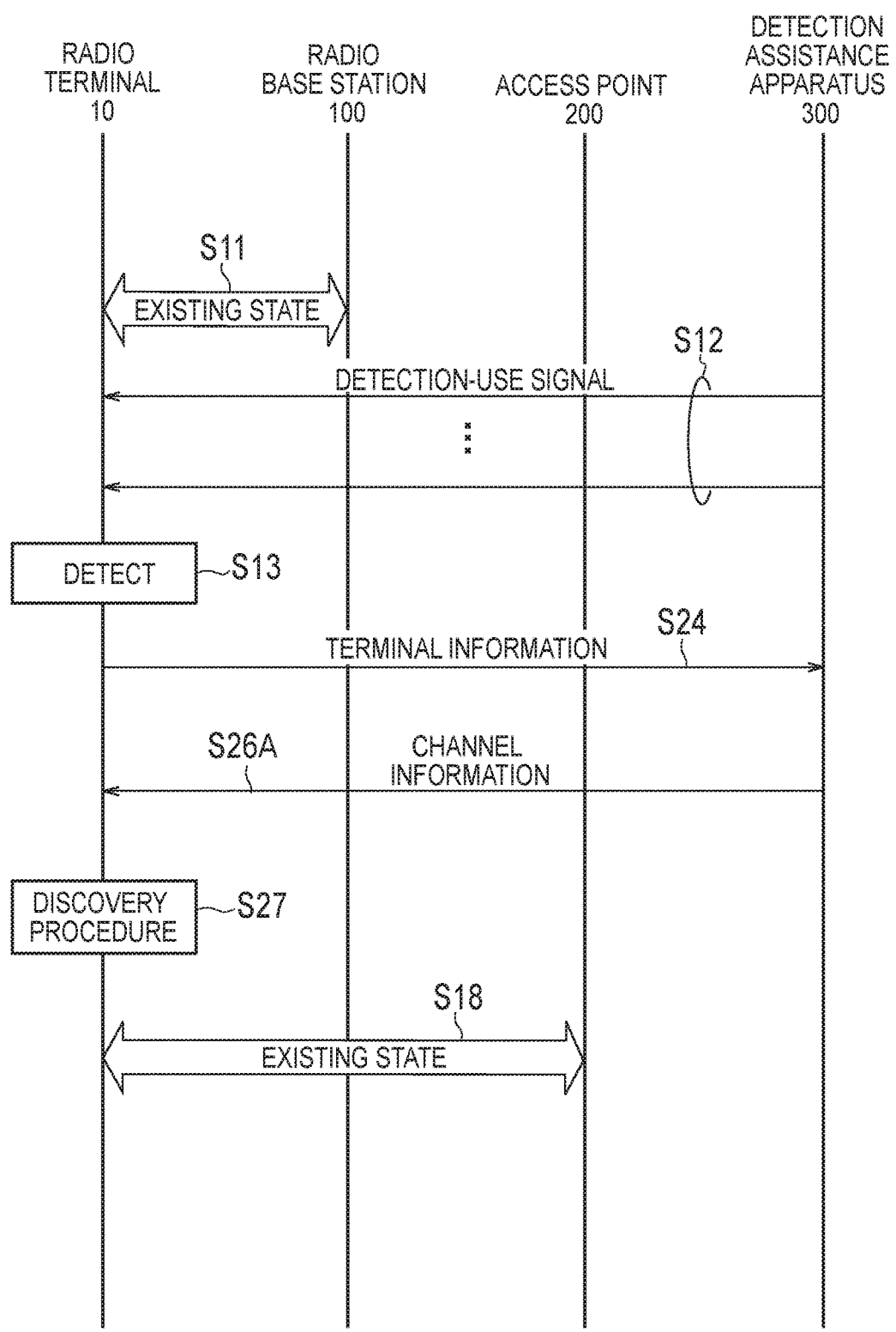
FIG. 8 is a sequence diagram illustrating a communication method according to a fifth modification.

More particularly, as illustrated in FIG. 8, in step S24, the radio terminal 10 transmits the terminal information (e.g., UE-ID) for identifying the radio terminal 10 to the detection assistance apparatus 300. In step S26A, the detection assistance apparatus 300 transmits to the radio terminal 10 channel information for identifying a channel used in the access point 200. In step S27, the radio terminal 10 uses the channel information to perform the discovery procedure for the access point 200.

It is noted that in FIG. 8, like step numbers are assigned to processes similar to those in FIG. 4. In FIG. 8, a description of similar processes to those of FIG. 4 will be omitted.

Here, in the fifth modification, the configuration information may be broadcast from the radio base station 100 in much the same way as in the first modification. In such a case, the configuration information preferably is replaced by information indicating a condition to transmit the terminal information to the detection assistance apparatus 300.

[Sixth Modification]

A sixth modification of the first embodiment will be described, below. Description proceeds with a focus on a difference from the first embodiment, below.

Specifically, in the first embodiment, the detection assistance apparatus 300 is provided in the access point 200. Unlike this, in the sixth modification, the detection assistance apparatus 300 is provided separately of the access point 200. In the sixth modification, the access point 200 transmits, to the radio base station 100, in response to detection of the detection-use signal broadcast, in the third coverage area 300A, from the detection assistance apparatus 300, information (hereinafter, "association information) for associating the access point 200 and the detection assistance apparatus 300. For example, the association information is included in a message (eNB Configuration Update) transmitted from the access point 200 to the radio base station 100. As a result, the radio base station 100 is capable of broadcasting, only when the detection assistance apparatus 300 is provided together with the access point 200, the configuration information described in the second modification.

In the sixth modification, the access point 200 preferably identifies a type of the detection-use signal by the detection of the detection-use signal. The access point 200 preferably transmits, as the association information, information for identifying the type of the detection-use signal, to the radio base station 100.

More particularly, as illustrated in FIG. 9, in step S31, the detection assistance apparatus 300 regularly broadcasts, in the third coverage area 300A, the detection-use signal.

In step S32, the access point 200 receives the detection-use signal broadcast, in the third coverage area 300A, from the detection assistance apparatus 300.

In step S33, the association information for associating the access point 200 and the detection assistance apparatus 300 is transmitted to the radio base station 100.

[Seventh Modification]

A seventh modification of the first embodiment will be described, below. Description proceeds with a focus on a difference from the first embodiment, below.

Specifically, in the first embodiment, a type of the detection assistance apparatus 300 is not particularly limited, and the detection assistance apparatus 300 is a apparatus that transmits a signal of a WLAN service, ibeacon (registered trademark) or Air Stamp (registered trademark). Unlike this, in the seventh modification, the detection assistance apparatus 300 is a apparatus that provides a radio communication service in which a frequency of 2.4 GHz band or 5 GHz band is used.

In such a case, while the access point 200 may identify an identifier (e.g., SSID) of the detection assistance apparatus 300 by the detection-use signal broadcast from the detection assistance apparatus 300, and may transmit, together with an identifier of the access point 200, the identifier of the detection assistance apparatus 300 to the radio base station 100. As a result, the radio base station 100 is capable of updating a list of base stations (e.g., Neighbor List) provided around the detection assistance apparatus 300. For example, the radio base station 100 is capable of instructing, when both the access point 200 and the detection assistance apparatus 300 are included in the list of base stations, the radio terminal 10 to which, either the access point 200 or the detection assistance apparatus 300, the radio terminal 10 should connect. A partner to which the radio terminal 10 should connect is determined on the basis of at least any one of information of an interference amount from the access point 200, a concentration situation of the access point 200, an interference amount from the detection assistance apparatus 300, and a concentration situation of the detection assistance apparatus 300, for example.

Alternatively, the radio terminal 10 may previously store the identifier (SSID) of the detection assistance apparatus 300 provided together with the access point 200. The radio terminal 10 starts the discovery procedure for the access point 200 upon detection of the detection-use signal broadcast from the detection assistance apparatus 300 provided together with the access point 200. In other words, when the access point 200 is not provided therewith, the radio terminal 10 does not start the discovery procedure for the access point 200 even upon detection of the detection-use signal broadcast from the detection assistance apparatus 300, but considers the connection to the detection assistance apparatus 300 in much the same way as in the conventional technology.

Other Embodiments

The present invention is described through the above-described embodiments, but it should not be understood that this invention is limited by the statements and the drawings constituting a part of this disclosure. From this disclosure, various alternative embodiments, examples, and operational technologies will become apparent to those skilled in the art.

Although not particularly mentioned in the embodiment, when the detection assistance apparatus 300 is a apparatus that provides a radio communication service in which a frequency of 2.4 GHz band or 5 GHz band is used, the radio terminal 10 may perform, upon detection of the detection-use signal broadcast from the detection assistance apparatus 300, handover from the radio base station 100 to the detection assistance apparatus 300 without starting the discovery procedure for the access point 200.

Although not particularly mentioned in the embodiment, the access point 200 preferably adopts beamforming for realizing high-speed data communication, and preferably changes a beam pattern, in a random manner, to expand the second coverage area 200A. In such a case, a time period during which one beam pattern is formed (beam formation time period unit) is short, and thus, the radio terminal 10 may not be capable of receiving a signal broadcast from the access point 200 (e.g., SIB) due to restriction of the beam formation time period unit and a message length. Therefore, it is preferable to shorten the message length of the signal broadcast from the access point 200 (e.g., SIB) than a message length of SIB used in a general mobile communication network.

A relationship in magnitude among the first coverage area 100A, the second coverage area 200A, and the third coverage area 200A is not limited to the relationship in magnitude in the above-described embodiment. For example, the first coverage area 100A and the second coverage area 200A may be the same in size.

The entire content of Japanese Patent Application No. 2014-146266 (filed on Jul. 16, 2014) is incorporated in the present specification by reference.

INDUSTRIAL APPLICABILITY

The present invention is useful in the field of mobile communication.

The invention claimed is:

1. A communication system, comprising: a radio base station having a first coverage area; an access point having a second coverage area; and a detection assistance apparatus having a third coverage area, wherein
   at least a part of the second coverage area overlaps the first coverage area,
   at least a part of the second coverage area overlaps the third coverage area,
   a radio terminal existing in the radio base station in the first coverage area transmits, to the detection assistance apparatus, terminal information for identifying the radio terminal and network information for identifying a mobile communication network to which the radio base station belongs, in response to detection of a signal broadcast in the third coverage area from the detection assistance apparatus,
   the detection assistance apparatus transmits the terminal information to the radio base station identified by the network information, and
   the radio base station transmits, to the radio terminal, channel information for identifying a channel used in the access point.

2. The communication system according to claim 1, wherein
   the detection assistance apparatus is provided in the access point.

3. The communication system according to claim 1, wherein the second coverage area is smaller than the first coverage area, and
   the third coverage area is smaller than the first coverage area and larger than the second coverage area.

4. A communication system, comprising:
   a radio base station having a first coverage area; an access point having a second coverage area; and a detection assistance apparatus having a third coverage area, wherein
   at least a part of the second coverage area overlaps the first coverage area,
   at least a part of the second coverage area overlaps the third coverage area,
   a radio terminal existing in the radio base station in the first coverage area transmits, to the detection assistance apparatus, terminal information for identifying the radio terminal, in response to detection of a signal broadcast in the third coverage area from the detection assistance apparatus,
   the detection assistance apparatus or the radio base station transmits, to the radio terminal, channel information for identifying a channel used in the access point,
   the detection assistance apparatus is provided separately of the access point, and
   the access point transmits, to the radio base station, in response to detection of the signal broadcast, in the third coverage area, from the detection assistance apparatus, information for associating the access point and the detection assistance apparatus.

* * * * *